R. J. EHLERS.
WHEEL BEARING FOR FURNITURE.
APPLICATION FILED DEC. 28, 1918.
1,342,279.
Patented June 1, 1920.
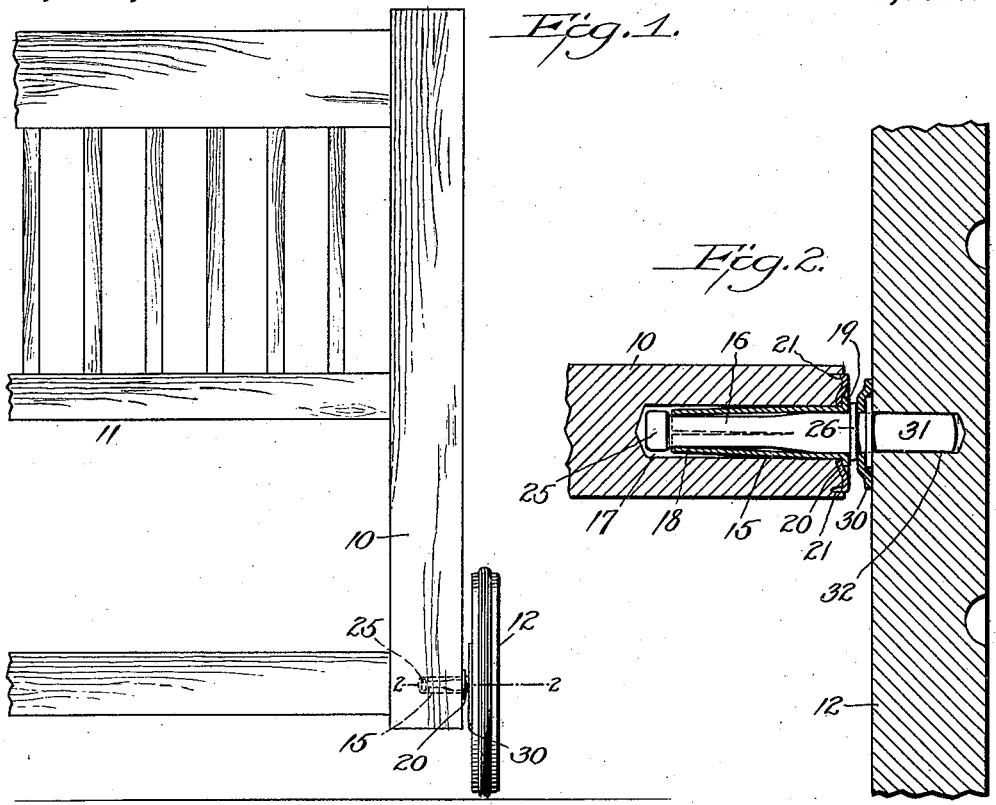
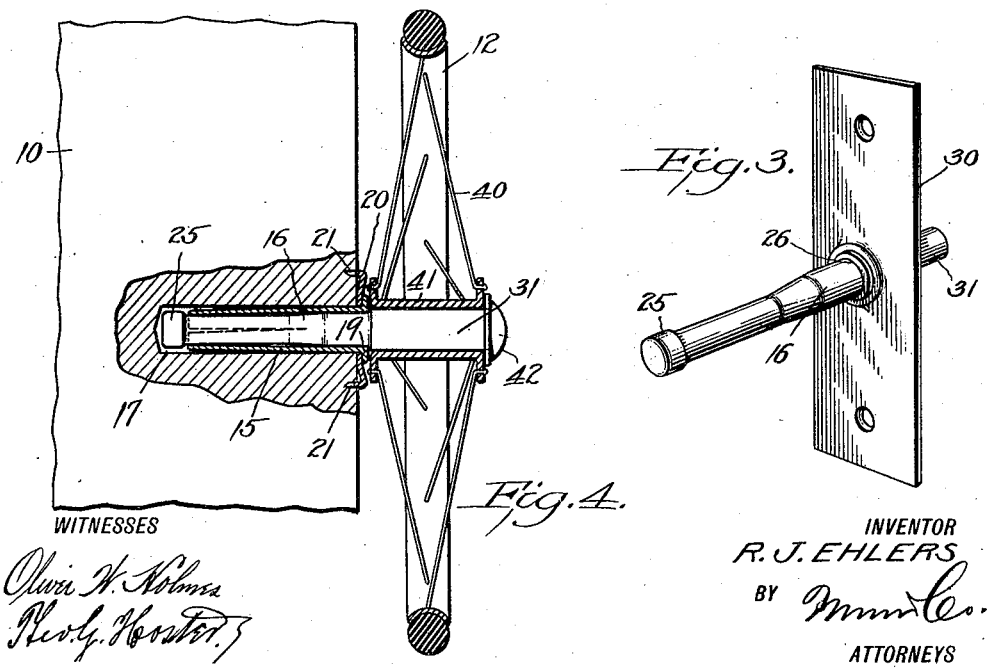
WITNESSES
INVENTOR
R. J. EHLERS
BY
ATTORNEYS

UNITED STATES PATENT OFFICE.

ROBERT J. EHLERS, OF NORTHPORT, NEW YORK.

WHEEL-BEARING FOR FURNITURE.

1,342,279.     Specification of Letters Patent.     Patented June 1, 1920.

Application filed December 28, 1918.  Serial No. 268,697.

*To all whom it may concern:*

Be it known that I, ROBERT J. EHLERS, a citizen of the United States, and a resident of Northport, in the county of Suffolk and State of New York, have invented a new and Improved Wheel-Bearing for Furniture, of which the following is a full, clear, and exact description.

The object of the invention is to provide a new and improved wheel bearing more especially designed for use on bassinets, cribs, beds and other pieces of furniture intended to be wheeled about, and the said wheel bearing is arranged to permit of quickly mounting the wheels on the piece of furniture to insure easy running of the wheels without danger of wabbling or binding. Another object is to provide a bearing which is very simple and durable in construction, cheap to manufacture and easily and quickly applied without requiring skilled labor.

With these and other objects in view the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 1 is a front elevation of the bearing arranged for a wooden wheel and shown as applied to a post or the like of a bassinet;

Fig. 2 is an enlarged sectional plan view of the same on the line 2—2 of Fig. 1;

Fig. 3 is a perspective view of the spindle; and

Fig. 4 is a sectional plan view of the wheel bearing as applied and arranged for a wheel having wire spokes and a metallic hub.

In providing bassinets and similar pieces of furniture with wheels, it is now customary to use a screw as an axle for the wheel to turn on. This screw after being passed through the wheel hub with washers at each end of the hub is screwed into the post or leg of the piece of furniture. This operation requires time and the services of a skilled workman but at the best the wheels do not run true and wabble. With my construction presently described in detail the wheels can be quickly mounted on the piece of furniture without the help of skilled labor, and an easy and true running of the wheels is insured.

The wheel bearing illustrated in Figs. 1 and 2 is shown applied to the lower end of a post or a leg 10 of a bassinet 11 or other piece of furniture to be mounted on wheels 12 engaging the bearings. The bearing in its general construction comprises a thimble skein 15 and a spindle 16 engaging the thimble skein and carrying the wheel 12. The thimble skein 15 is driven into a hole 17 drilled into the post or leg 10, and the inner end 18 of the thimble skein 15 is split, as plainly indicated in Figs. 2 and 4. The outer end of the thimble skein 15 is provided with a short flange 19 and is secured in any suitable manner to an attaching flange 20 provided at its peripheral edge with angular prongs 21 driven into the face of the post or leg 10 so as to securely hold the thimble skein 15. in position in the hole 17.

The inner end of the spindle 16 is provided with a head 25 adapted to pass through the split end 18 of the thimble skein 15 on driving the spindle 16 into the said thimble skein 15, it being understood that the split end 18 temporarily opens by its resiliency to allow the head 25 to pass, and when the head 25 has passed through the split end the latter again closes by its own resiliency with the head 25 abutting against the inner end of the thimble skein 15 to hold the spindle 16 against outward movement. The spindle 16 is provided at the outer end with an annular flange or shoulder 26 abutting against the flange 19 to limit the inward movement of the spindle 16 in the thimble skein 15. It will be noticed that the thimble skein 15 is slightly tapered at its inner portion and the spindle 16 is somewhat reduced between the outer end and the head 25 so that the spindle 16 has two spaced bearings on the thimble skein 15, that is, at the outer end of the thimble skein and at the inner end thereof thus securely holding the spindle against wabbling in the thimble skein.

In case a wooden wheel is used, as shown in Figs. 1 and 2, then the spindle 16 is attached adjacent the flange 26 to a bracket 30 fastened by screws or other fastening means to the inner face of the wheel 12. The spindle is preferably provided with a projecting pin 31 fitting into a recess 32 bored centrally into the inner face of the wheel to securely hold the spindle in position in the wheel. In case the wheel 12 is provided with wire spokes 40 attached to a metallic hub 41, as shown in Fig. 4, then the bracket 30 is dispensed with and the pin 31 of the spindle 16 fits into the hub 41, and the outer end of the pin 31 is provided with a head 42 abutting against the outer end of the hub 41, the inner end of the hub resting against the flange 19 of the thimble skein 15. Otherwise the construction is the same as above described in reference to Figs. 1, 2 and 3, and further description is not deemed necessary.

It will be noticed that by the arrangement described the thimble skein can be readily driven into the hole 17 of the post or leg 10 of the piece of furniture on which the wheel bearing is to be used, and the said thimble skein is securely fastened in position on the post or leg by the prongs 21 of the attaching flange 20.

It will further be noticed that the spindle 16 can be readily attached to the wooden wheel 12 by the use of the bracket 30, and in case the wheel with wire spokes and metallic hub is used then the hub is slipped onto the pin 31 prior to driving the spindle 16 into position in the thimble skein 15.

From the foregoing it will be noted that the parts can be readily assembled in a comparatively short time and without the employment of skilled labor.

Having thus described my invention, I claim as new and desire to secure by Letters Patent:

A wheel bearing for furniture, comprising a thimble skein having a split inner end and provided with an annular flange at its outer end, the said flange having angular prongs adapted to be driven into a post or leg of a piece of furniture, a spindle having at its inner end a head adapted to pass through and temporarily open the split end of the thimble on driving the spindle into the thimble skein, the head abutting against the said inner end of the thimble skein to hold the spindle against outward movement, the said spindle having a shoulder abutting against the outer end of the said thimble skein, an attaching bracket on the said spindle adjacent the said shoulder to attach the spindle to the wheel, and a pin forming an extension of the said spindle and engaging a central recess in the wheel.

ROBERT J. EHLERS.